US008379103B2

(12) United States Patent
Kawahara

(10) Patent No.: US 8,379,103 B2
(45) Date of Patent: Feb. 19, 2013

(54) DIGITAL CAMERA THAT USES OBJECT DETECTION INFORMATION AT THE TIME OF SHOOTING FOR PROCESSING IMAGE DATA AFTER ACQUISITION OF AN IMAGE

(75) Inventor: Takumi Kawahara, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/067,298

(22) Filed: May 23, 2011

(65) Prior Publication Data

US 2011/0228125 A1    Sep. 22, 2011

Related U.S. Application Data

(63) Continuation of application No. 11/905,587, filed on Oct. 2, 2007, now Pat. No. 7,973,824.

(30) Foreign Application Priority Data

Oct. 12, 2006  (JP) ................................ 2006-279248

(51) Int. Cl.
*H04N 5/228* (2006.01)
*H04N 5/222* (2006.01)
*G06K 9/00* (2006.01)

(52) U.S. Cl. ................. 348/222.1; 348/333.12; 382/118

(58) Field of Classification Search .................... 348/77, 348/78, 222.1, 333.01, 333.12; 396/18, 51; 382/117, 118

See application file for complete search history.

(56) References Cited

U.S. PATENT DOCUMENTS

| 2003/0071904 A1 | 4/2003 | Karasaki et al. |
| 2005/0024516 A1 | 2/2005 | Fish et al. |
| 2005/0046730 A1 | 3/2005 | Li |
| 2005/0248681 A1 | 11/2005 | Nozaki et al. |
| 2006/0061598 A1 | 3/2006 | Mino et al. |
| 2007/0182829 A1 | 8/2007 | Zacks et al. |

FOREIGN PATENT DOCUMENTS

| CN | A-1694508 | 11/2005 |
| EP | 1 128 316 A1 | 8/2001 |
| EP | 1 594 311 A2 | 11/2005 |
| EP | 1 669 890 A1 | 6/2006 |
| EP | 1 737 216 A1 | 12/2006 |
| JP | A-06-259534 | 9/1994 |
| JP | A-2003-125251 | 4/2003 |
| JP | A-2004-193977 | 7/2004 |
| JP | A-2005-012307 | 1/2005 |

(Continued)

OTHER PUBLICATIONS

Dec. 14, 2011 Office Action issued in EP Application No. 10192083.3.

(Continued)

*Primary Examiner* — Kelly L Jerabek
(74) *Attorney, Agent, or Firm* — Oliff & Berridge, PLC

(57) ABSTRACT

A digital camera includes an object detecting unit which analyzes an analysis target image including a through image data taken in from an image pickup device to compose a shot of an object, a shot image, or a reduced image, based on a feature appearing in an image representing a subject of shooting, and detects at least one main object captured in the analysis target image, a subject information extracting unit which extracts, for each image of object detected by the object detecting unit, subject information including a position in a screen corresponding to the analysis target image and its expansion, and a tag data writing unit which writes the subject information, as a part of tag data corresponding to the shot image, to a storage medium, thereby enabling use of the information acquired by object detection at the time of shooting, also after the acquisition of the image.

3 Claims, 6 Drawing Sheets

FOREIGN PATENT DOCUMENTS

JP　　A-2006-227080　　8/2006

OTHER PUBLICATIONS

Jul. 8, 2010 Office Action issued in Chinese Patent Application No. 200710180761.X.

Japanese Office Action issued Mar. 22, 2011 for Japanese Patent Application No. 2006-279248.

European Search Report issued Feb. 10, 2011 for European Patent Application No. 10192082.5.

European Search Report issued Feb. 16, 2011 for European Patent Application No. 10192083.3.

(a)

(b)

| | | | |
|---|---|---|---|
| SHOOTING INFORMATION | DATE OF SHOOTING | DD/MM/YY | |
| | FLASH | ON | |
| SETTING INFORMATION | FACE DETECT | SIZE OF THROUGH IMAGE | |
| | ON | 320 × 240 | |
| FRAME NO. | CORDINATES | SIZE | FEATURING INFORMATION |
| 1 | X1, Y1 | P1 × Q1 | $(Ex_1, Ey_1), (Nx_1, Ny_1), \cdots$ |
| 2 | X2, Y2 | P2 × Q2 | RECOGNIZED (FAMILY MEMBER 1) |
| . | . | . | . |
| . | . | . | . |

SUBJECT INFORMATION

DIGITAL CAMERA THAT USES OBJECT DETECTION INFORMATION AT THE TIME OF SHOOTING FOR PROCESSING IMAGE DATA AFTER ACQUISITION OF AN IMAGE

This is a Division of application Ser. No. 11/905,587 filed Oct. 2, 2007. The disclosure of the prior application is hereby incorporated by reference herein in its entirety.

CROSS-REFERENCE TO RELATED APPLICATION

This application is based upon and claims the benefit of priority from Japanese Patent Application No. 2006-279248, filed on Oct. 12, 2006, the entire contents of which are incorporated herein by reference.

BACKGROUND

The present invention relates to a digital camera having facilities which detect a main object such as a person from through image data, that is, image data obtained by thinning-out reading from an image pickup device to provide a moving image for view finder to a user, and provide information related to the detected object for a process to realize shooting support facility such as automatic focusing (AF) control.

DESCRIPTION OF THE RELATED ART

As shooting support facilities for a digital camera a digital camera, a technique of controlling an automatic focusing (AF) control mechanism on the basis of an image obtained from a preset expected subject area or an area designated by the user operating a button or the like provided on an operating panel is proposed.

Moreover, a technique of analyzing through image data acquired in the process of composing a shot by the user before shooting and thereby detecting an area having a feature of an image representing a human face, and focusing on the human face detected as a subject on the basis of image data of the detected area, is proposed and practically used.

By using this face detecting technique, it is possible to securely focus on a subject irrespective of whether there is a main object in a focus adjusting area provided in advance at the center of a frame or the like. Thus, shooting in a free composition can be realized.

Meanwhile, a technique of extracting a featuring point of a human face from a shot image and identifying an individual face obtained as a subject in the shot image on the basis of the degree of matching with a featuring point of a registered person, is proposed (Japanese Unexamined Patent Application Publication No. Hei-6-259534).

Note that, as image pickup devices provided in digital cameras have an increasing number of pixels, the image quality of shot images is significantly improved. For example, even when a part of a shot image is enlarged in playback, the image has sufficiently high quality that can be viewed clearly.

As one of the facilities to utilize such good image quality of the digital camera, a facility is provided which enables a liquid crystal display section provided in the digital camera or a projector connected to the digital camera via a cable to enlarge a desired part of a shot image in display.

To deal with such enlarged display facilities, in the digital camera in which AF control is carried out on the basis of an image in an expected subject area or a user-designated area as described above, information indicating the expected subject area or the designated area is recorded to a storage medium together with the shot static image (hereinafter referred to as a shot image), a thumbnail image corresponding to this shot image, tag data related to the shooting date and time and so on (Japanese Unexamined Patent Application Publication No. 2004-193977 and No. 2003-125251). As the information related to the expected subject area or the designated area is thus recorded in association with the shot image as a part of the information related to the shooting, linking to the enlarged display facilities after shooting is realized.

Meanwhile, the above-described technique of Japanese Unexamined Patent Application Publication No. 2004-193977 assumes that a main object is captured in the expected subject area, as an image to be shot. Therefore, for example, it cannot deal with a case of capturing the object in the expected subject area, then half-pressing the shutter button to focus, and then shooting an off-center subject. The technique of Japanese Unexamined Patent Application Publication No. 2003-125251 enables execution of AF control for a designated area located at a desired position. To this end, however, the user must operate the AF cursor to decide the designated area during shooting.

On the other hand, in the digital camera employing the face detecting technique, secure AF control can be carried out wherever in a frame the face of a person is located. Therefore, satisfactory shooting can be carried out with a composition having an extremely high degree of freedom and without performing complicated operations.

However, in the related art, the information acquired by face detection is provided exclusively for a shooting process such as AF control. No linking is made with facilities prepared for the processes after the acquisition of the shot image (for example, slide-show facilities including the above-described enlarged display facility).

Note that, as the capacity of the storage medium for storing the image is increased, the number of images shot by the user of the typical digital camera increases very much.

Therefore, for example, a technique of automatically filing a large number of shot images on the basis of various viewpoints, such as filing by each shot object, in addition to the shooting date and time, is demanded.

For example, if the above-described face detecting and recognizing technique is applied to shot images, it is possible to extract images in which each object is captured. It is thus possible to selectively take or leave shot images depending on whether a desired object is captured in the images, and to file the shot images by each object.

However, since the image data shot by the recent digital camera is of an extremely large volume, as described above, detecting an area corresponding to a human face in a shot image requires longer amount of time corresponding to increasing the number of pixels in the shot image.

SUMMARY

It is an object of the invention to provide a digital camera in which information acquired by object detection at the time shooting can be used also after acquisition of an image by the shooting.

It is another object of the invention to enable use of subject information for object detection acquired in the shooting process, in slide-show with display of shot images or in filing works.

The above objects are achieved by a digital camera configured as follows.

An object detecting unit analyzes an analysis target image including a through image data taken in from an image pickup device at the time of composing a shot, a shot image acquired by shooting, or a reduced image acquired by reducing the shot image, on the basis of a feature appearing in an image representing a subject of shooting including a person, an animal and a plant, and detects at least one main object captured in the analysis target image. A subject information extracting unit extracts, for each image of at least one object detected by the object detecting unit from the analysis target image corresponding to a shot image acquired by shooting, subject information including position data which represents a position of the image of the object on a screen corresponding to said analysis target image and corresponding to an expansion of the image of the object. A tag data writing unit writes the subject information extracted corresponding to each object, as a part of tag data corresponding to the shot image, to a storage medium which stores image data representing the shot image.

The above objects of the invention are also achieved by another digital camera configured as follows.

In the object detecting unit provided in the above-described digital camera, a face detecting unit detects, an area of the person's face captured in the analysis target image that occupies the screen. The detection is carried out on the basis of a feature appearing in an image representing a person's face. In the subject information extracting unit, a position data collecting unit collects position data representing a position and size of the area detected by the face detecting unit, as a part of the subject information. An alignment data collecting unit collects alignment data representing alignment of featuring parts including eyes and mouth in an image representing each of at least one object face in each area detected by the face detecting unit, as a part of the subject information.

The above-described objects are also achieved by another digital camera configured as follows.

In the subject information extracting unit provided in the above-described digital camera, an area data collecting unit collects information representing, by pixel, a pixel position in the analysis target image corresponding to an upper left point in a rectangular area including an image of the object detected by the object detecting unit and a size of the rectangular area, as a part of the subject information.

The above-described objects are also achieved by another digital camera configured as follows.

In the tag data writing unit provided in the above-described digital camera, a criteria storing unit stores a criterion registered in advance to determine significance of at least one object detected by the object detecting unit. A significance evaluating unit evaluates significance of each object on the basis of the subject information extracted by the subject information extracting unit and the criterion. A sorting unit sorts each subject information in accordance with the significance shown by a result of the evaluation by the significance evaluating unit, and provides the sorted subject information for a writing process of the tag data.

In the digital camera according to the invention configured as described above, it is possible to provide subject information related to an object acquired at the time of shooting, for a process related to shot image data.

Thus, in various facilities such as enlarged display in slide-show facilities or image filing for each object, these facilities can be realized very quickly without a process of narrowing an area to be enlarged or an area where an object to be recognized exists.

DETAILED DESCRIPTION OF EMBODIMENTS

Hereinafter, an embodiment of the invention will be described in detail.

Figure 1:
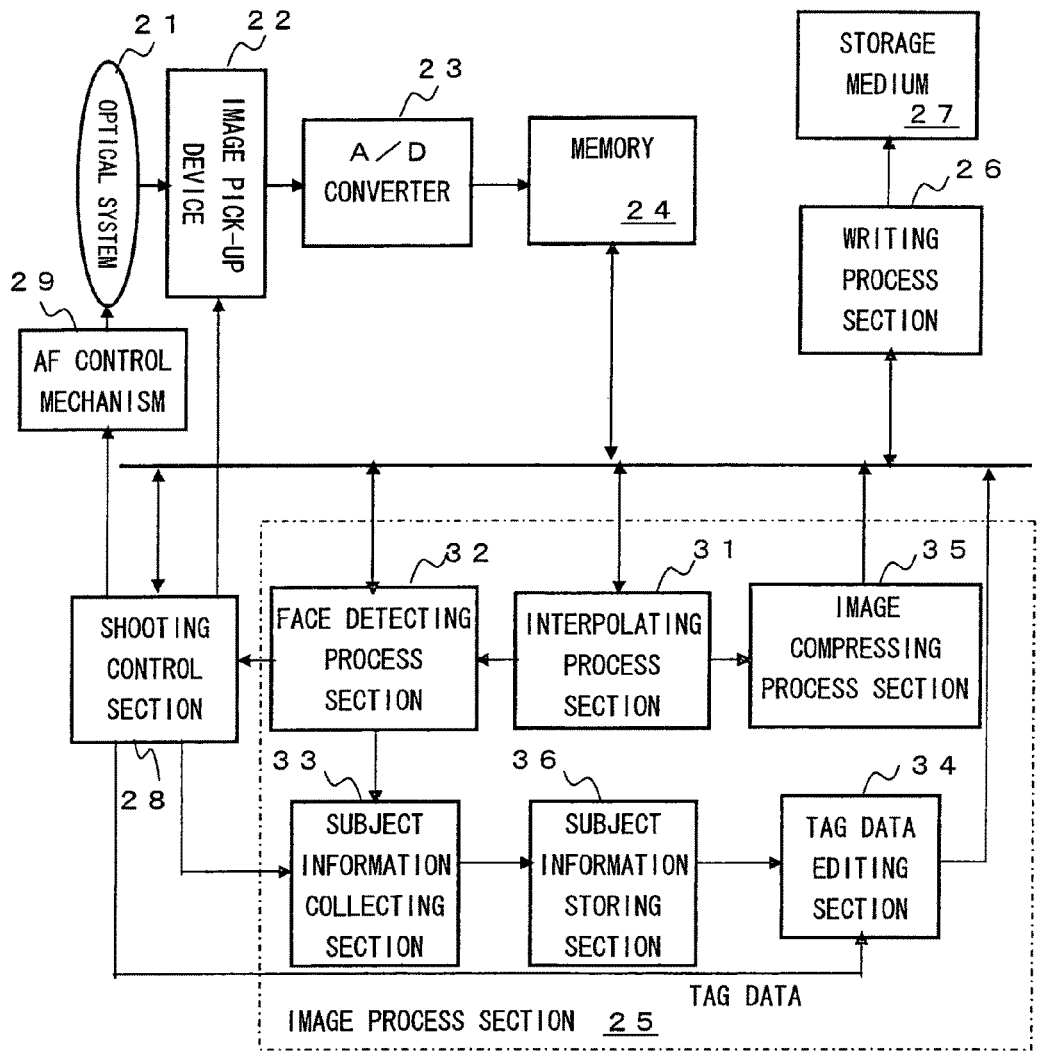
FIG. 1 is a view showing an embodiment of a digital camera according to the invention.

FIG. 1 shows an embodiment of a digital camera according to the invention.

In the digital camera shown in FIG. 1, light caused to form an image on an image pickup device 22 by an optical system for shooting 21 at the time of shooting an image is converted to an electric signal according to its intensity by the image pickup device 22, then further converted to digital data by an analog/digital (A/D) converter 23, and stored into a memory 24.

Also, at the time of composing a shot before shooting, thinning-out reading is periodically carried out from the image pickup device 22 (approximately 30-60 frames per second). This image signal is digitized by the A/D converter 23 and provided via the memory 24 for an interpolating process by an interpolating process section 31 of an image process section 25. Thus, a so-called through image data is formed.

This through image data is sent to a liquid crystal display section (not shown) via a display process section (not shown), and it is provided for a process of providing a view to compose a shot to the user and also provided for a process of detecting a person's face captured in the through image data, by a face detecting process section 32. Then, on the basis of the result of the detection by the face detecting process section 32, an automatic focusing (AF) control mechanism 29 is controlled by a shooting control section 28, and the optical system for shooting 21 automatically focuses on the person's face captured in the through image data.

Also, information extracted in the face detecting process by the above-described face detecting process section 32 is sent to a subject information collecting section 33 shown in FIG. 1. The information is collected as subject information related to a feature of the face as an object, as will be described later, and is sent to a tag data editing section 34 via a subject information storing section 36.

A shooting instruction inputted by the user operating a shutter button (not shown) is transmitted to the image pickup device 22 and the image process section 25 via the above-described shooting control section 28. In accordance with this, image signals corresponding to outputs of all the pixels forming the image pickup device 22 are stored into the memory 24. As these image signals are provided for the process by the interpolating process section 31, image data representing one frame of shooting image is provided. The image data acquired in this manner is compressed by an image compressing process section 35 and is written to a storage medium 27 via a writing process section 26.

At this time, in response to an instruction from the shooting control section 28, for example, the subject information that is stored last in the subject information storing section 36 is sent to the tag data editing section 34 and provided for a tag data editing process, which will be described later. Then, the edited tag data is sent to the writing process section 26 together with the image data compressed by the image compressing process section 35 and is written to the storage medium 27 such as an SD card.

Hereinafter, a facility to produce subject information and write it as a part of tag data in an exemplary case of using the result of face detection will be described in detail.

Figure 2:
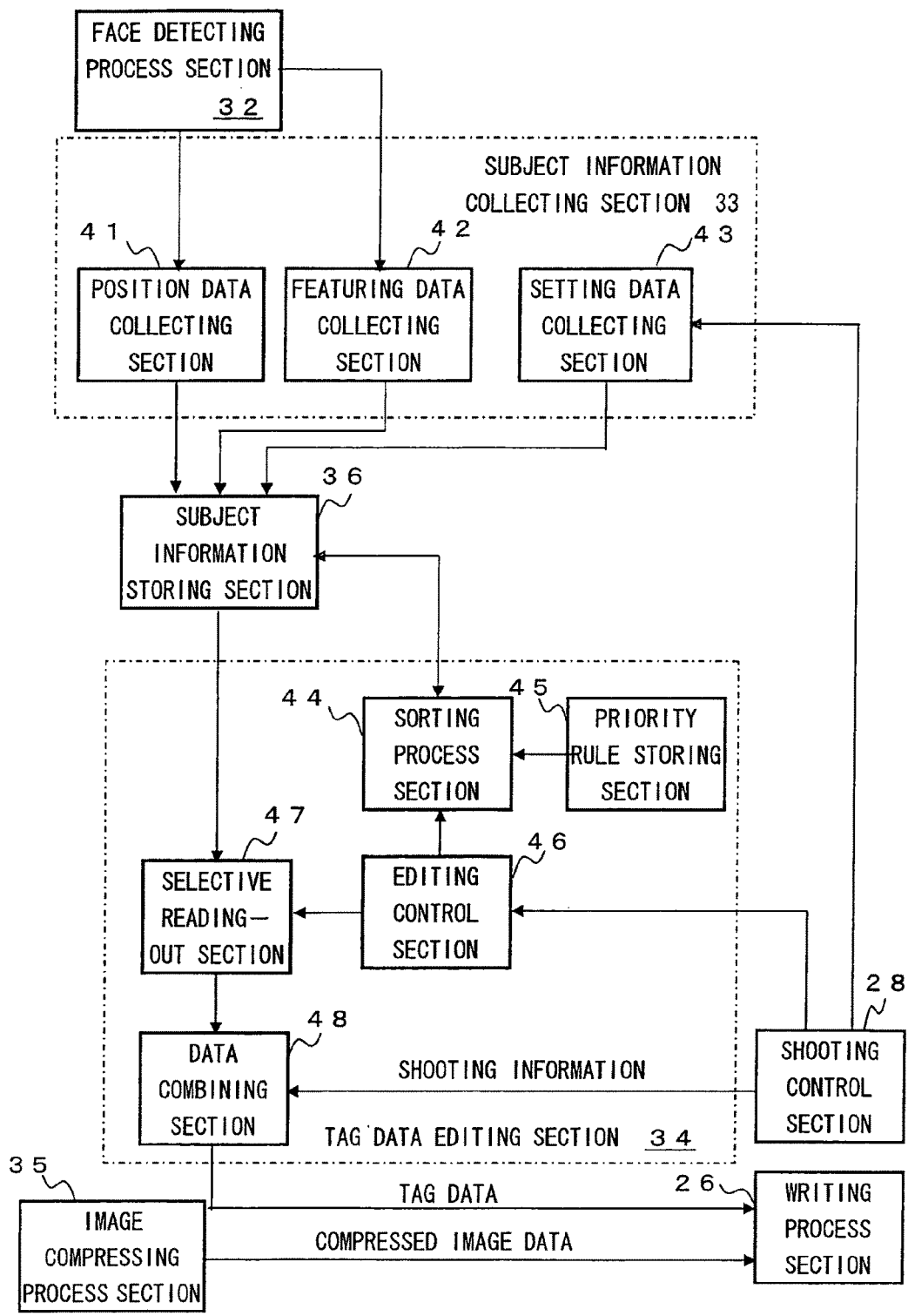
FIG. 2 is a is a view showing a detailed configuration of each part related to production of tag data.
Figure 3:
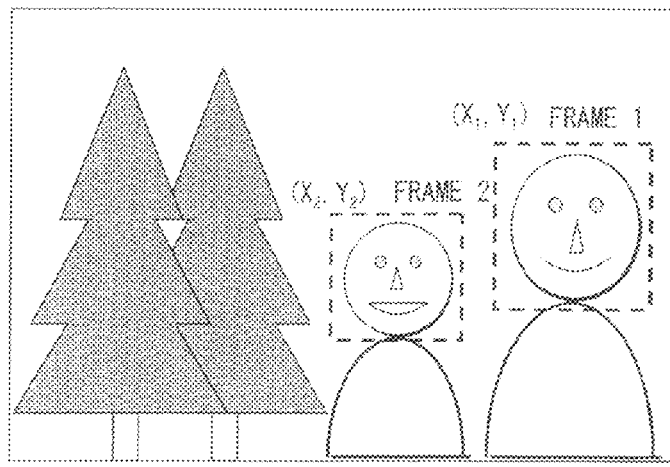
FIG. 3A and FIG. 3B are views showing an example of tag data.

FIG. 2 shows a detailed configuration of each section related to production of tag data. FIG. 3 shows an example of tag data. Moreover, FIG. 4 shows a flowchart showing a tag data writing operation.

Figure 4:
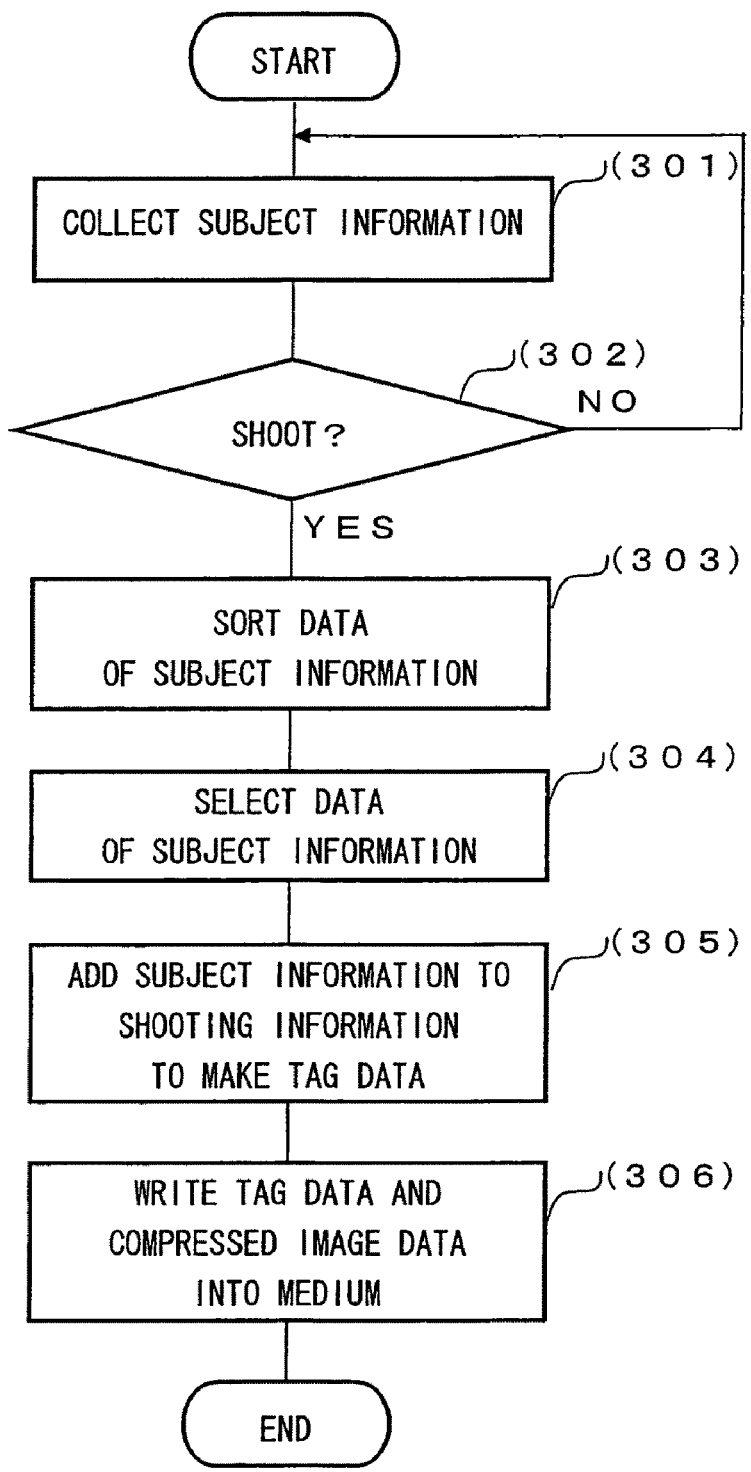
FIG. 4 is a flowchart showing a tag data writing operation.

In the subject information collecting section 33 shown in FIG. 2, a position data collecting section 41 and a featuring data collecting section 42 collect position data related to the position in the screen of each image representing the face detected in the process by the face detecting process section 32 and featuring data related to the alignment of eyes, nose, mouth and so on, which are featuring parts of the face, in the image corresponding to the detected face, respectively (step 301 in FIG. 4).

The position data collecting section 41 can collect, for example, the coordinates (X1, Y1) and (X2, Y2) of the upper left pixels of frames 1 and 2 corresponding to the range of image corresponding to detected faces as indicated by bold broken lines in FIG. 3A, and the size (P1 by Q1, P2 by Q2) of these frames, as position data (see FIG. 3B). Also, the featuring data collecting section 42 can collect, for example, the coordinate's (Ex1, Ey1) and (Nx1, Ny1) representing the positions occupied in the through image data by the images representing eyes, nose, mouth and so on acquired in the face detecting process corresponding to the frames 1 and 2 shown in FIG. 3A, as featuring data (see FIG. 3B).

Also, in the subject information collecting section 33 shown in FIG. 2, a setting data collecting section 43 collects setting data including information indicating whether AF control using the result of the detection by the face detecting process section 32 is adopted by the shooting control section 28, and the size or the like of the through image data provided to the face detecting process section 32 (see FIG. 3B). The setting data collecting section 43 sends the collected setting data as a part of the subject information to the tag data editing section 34.

The collecting process by the position data collecting section 41 and the featuring data collecting section 42 is executed, for example, every time the face detecting process is carried out by the face detecting process section 32, until shooting is carried out. The collected position data and featuring data are sequentially sent and stored into the subject data storing section 36. In this case, as the subject information storing section 36 overwrites the previous position data and featuring data with the newly received position data and featuring data, the up-to-date subject information is maintained in the subject information storing section 36.

When a notification that a shooting process has been carried out is sent from the shooting control section 28 shown in FIG. 2 via an editing control section 46 (affirmative judgment in step 302 in FIG. 4), a sorting process section 44 provided in the tag data editing section 34 shown in FIG. 2 sorts the subject information stored in the subject information storing section 36 in accordance with a rule stored in a priority rule storing section 45 (step 303 in FIG. 4).

The priority rule storing section 45 shown in FIG. 2 stores, for example, a rule that "it should be determined that significance is higher for images of larger size detected as faces" and so on, as a rule to determine the significance of each of the results of face detection. In this case, the sorting process section 44 refers to the position data corresponding to each result of face detection stored in the subject information storing section 36 and sorts these position data and the corresponding featuring data in order from the largest size to smaller sizes.

Also, in the case where face recognition based on the degree of matching with features of a registered face is carried out in the face detecting process section 32, it is possible to carry out a sorting process of each position data included in the subject information and the corresponding featuring data on the basis that whether or not the result of face recognition is included in the featuring data (see FIG. 3B).

In this manner, after the subject information is sorted in accordance with the priority rule, a selective reading-out section 47, in response to an instruction from the editing control section 46, reads out a predetermined volume of subject information from the subject information storing section 36 corresponding to the volume of the tag data in advance (step 304 in FIG. 4), and sends the read-out data to a data combining section 48. For example, after the selective reading-out section 47 reads out setting data included in the subject information, the position data and the featuring data are read out in order from the highest priority until the sum of the data volume of the read-out subject information reaches a threshold value decided in accordance with the volume of the above-described tag data. Thus, the position data and the featuring data corresponding to significant objects can be provided for the tag data editing process.

The subject information thus read out is sent to the data combining section 48 shown in FIG. 2. By this data combining section 48, the subject information is added to shooting information (shooting date and time, use or non-use of a flash, and so on) related to shooting control provided from the shooting control section 28. Thus, tag data as shown in FIG. 3B is formed (step 305 in FIG. 4).

In this manner, the tag data including the subject information related to the object captured in the shot image is produced. This tag data is associated with the compressed image data provided to the writing process section 26 by the image compressing process section 35, and is then written to the storage medium 27 (step 306).

Since the tag data including the subject information is written in association with the compressed image data corresponding to the shot image as described above, the information related to face detection used for shooting control can be provided for the slide-show facility or for a post-shooting process such as an image filing process.

It is also possible to convert the position data collected by the position data collecting section 41 shown in FIG. 2 as coordinates representing the pixel position in the through image data into coordinates in a shot image formed by using the output of all the pixels of the image pickup device 22, and then send it to the subject information storing section 36, thereby omitting the similar coordinate conversion process at the time of using the slide-show facility.

It is also possible to carry out the above-described conversion process of coordinate values only for the position data read out by the selective reading-out section 47 and provide the coordinates representing the position in the shot image for the combing process with the shooting information.

On the other hand, in the case where the size of through image data coincides with the size of a thumbnail image, there is an advantage that it is enabling the coordinate values representing result of face detection in the through image, as direct use of the coordinate value representing the position of the face in the thumbnail image.

Also, the information to be written as subject information is not limited to the results of detection acquired by the face detecting facility, and it also possible to use the results of detection acquired by a facility to detect a part of image data having a feature appearing in images of various subjects that can be considered to be objects, as image data representing an image of an object, by analyzing through image data.

It is also possible to provide a shot image itself acquired by shooting or a reduced image such as a thumbnail image acquired by reducing the shot image, instead of through image data, for the process in the face detecting process section 32, and write subject information including the result of face detection thus acquired, as a part of tag data.

Hereinafter, a method of using the above-described subject information in the slide-show facility will be described.

Figure 5:
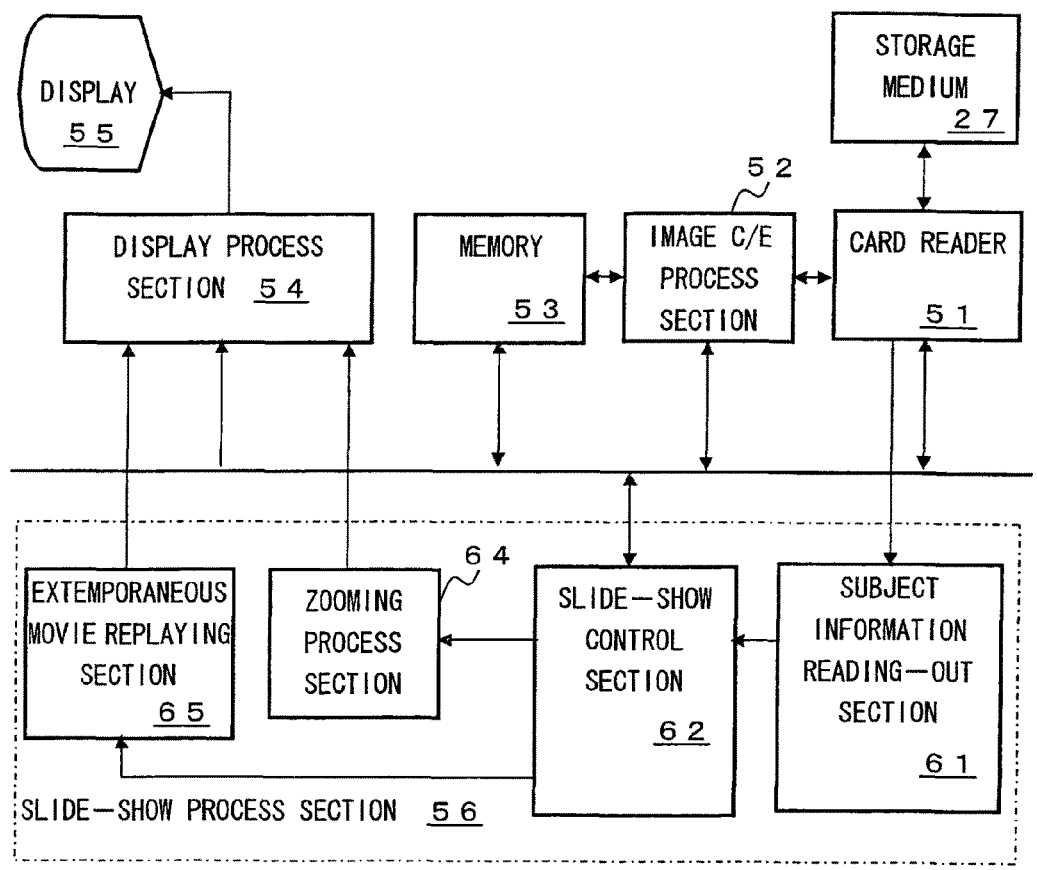
FIG. 5 is a view explaining a using method in slide-show facilities.

In a slide-show, as shown in FIG. 5, compressed image data written in the storage medium 27 such as an SD card is read out via a card reader 51 in accordance with an instruction from a slide-show process section 56. After the data is expanded by an image compressing and expanding (C/E) process section 52, it is provided for the process in a display process section 54 via a memory 53 and is provided to the user by a display section 55.

For example, when the compressed image data is to be read out from the storage medium 27, in accordance with an instruction from a slide-show control section 62 shown in FIG. 5, the subject information included in the corresponding tag data is read out by a subject information reading-out section 61 and is sent to the slide-show control section 62.

The subject information, thus read out, is sent to a zooming process section 64 via the slide-show control section 62. In response to this, the position data is converted on the basis of the ratio of the size of the through image data included in the subject information and the size of the shot image. An instruction to enlarge, in display, an area on the screen indicated by the resulting coordinates and size is given to the display process section 54. This enables realization of various facilities, for example, sequentially zooming each person's face in a shot image in which many persons are captured.

Here, since the above-described position data included in the subject information shows the face position detected by the face detecting facility in the through image data immediately before the acquisition of the shot image, the face position may not accurately coincide with the face position in the shot image. However, the composition of the through image data immediately before the acquisition of the shot image substantially coincides with the composition of the shot image. Therefore, it suffices to adopt the face position in the through image data immediately before the acquisition of the shot image, for the process of enlarging a person's face in display as described above. Meanwhile, in recent digital cameras having a larger number of pixels, since the size of image data is extremely large, it tends to take a long time to search image data representing a shot image for a part representing a person's face. Therefore, it is very advantageous to use the subject information acquired at the time of shooting as described above and thereby enable omission of such a search process.

In the case where the setting data included in the subject information shows that the size of the thumbnail image and the size of the through image data coincide with each other, when reading the thumbnail image one after another from the storage medium 27 and displaying them as an extemporaneous movie, the corresponding subject information is read out parallel to the reading-out of the thumbnail image, and the coordinates in the through image data acquired as position data corresponding to each result of face detection are directly sent to an extemporaneous movie replaying section 65. Thus, they can be used for highlighting of face position in extemporaneous movie replaying facilities (pictmotion facilities) using the thumbnail image.

It is also possible to use the subject information written in the above-described manner, in an image filing system.

Figure 6:
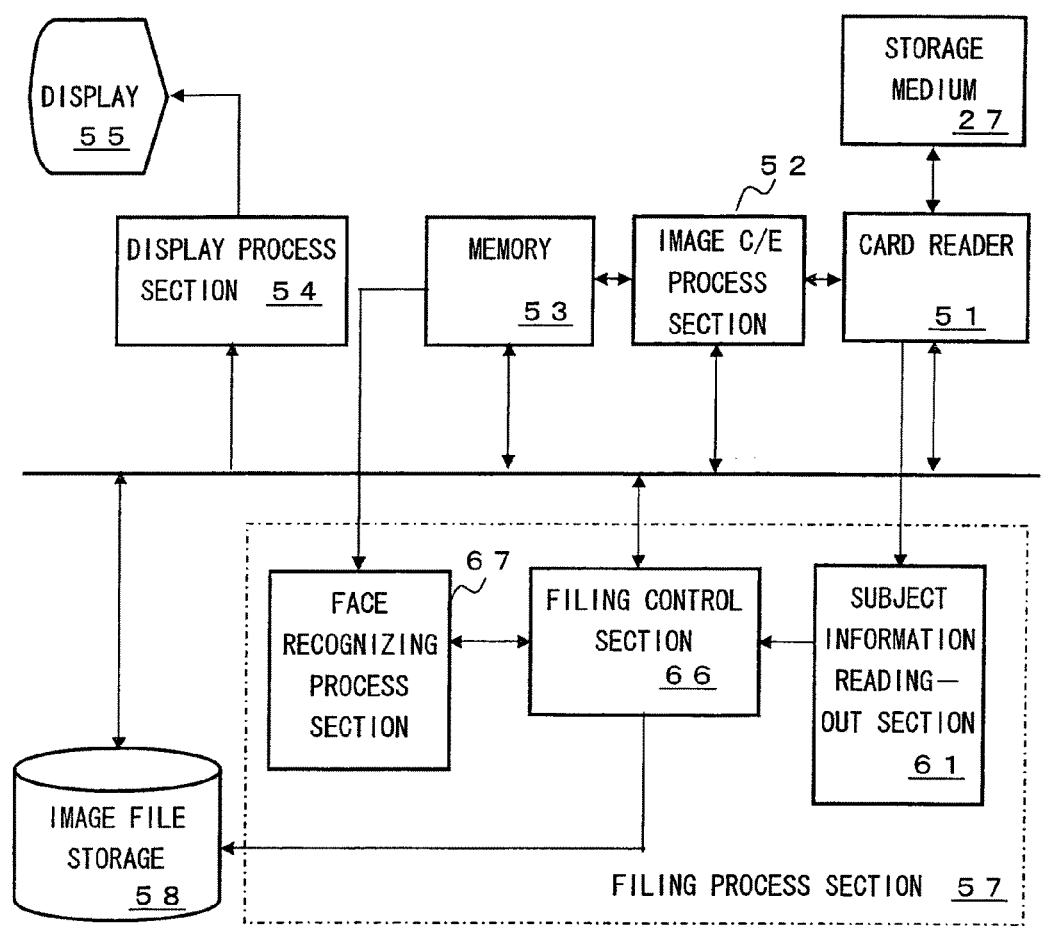
FIG. 6 is a view showing a configuration of an image filing system according to the invention.

FIG. 6 shows a configuration of an image filing system according to the invention.

Of the components shown in FIG. 6, the parts equivalent to those shown in FIG. 5 are denoted by the reference numerals shown in FIG. 5 and will not be described further in detail.

In the filing processing section 57 of the image filing system shown in FIG. 6, subject information read out by the subject information reading-out section 61 along with the reading-out of compressed image data is sent to a face recognizing process section 67 via a filing control section 66 and is provided for a process of reading image data corresponding to a face part of an object from the memory 53.

This subject information includes position data indicating the position of the face detected by the face detecting facility. Therefore, as the image data corresponding to the face part of the object is read out from the memory 53 on the basis of the position data, the process of specifying an area to which the face recognizing process is to be applied can be omitted in the face recognizing process section 67 and the time required for the face recognizing process can be reduced.

Although the face position indicated by the position data included in the subject information may not accurately coincide with the face position in the shot image as described above, this lack of coincidence will not cause any problem in narrowing the area to which the face recognizing process is to be applied.

Meanwhile, the process of newly searching large-sized image data (for example, image data of 8 million pixels) representing a shot image for an area where face recognition should be carried out, is very time-consuming. Therefore, it is very advantageous that this search process can be eliminated, and the face recognizing process by the face recognizing process section 67 can be made significantly faster. Moreover, by using featuring data included in the subject information, it is possible to realize the process of detecting a main featuring part at a higher speed.

As the image data representing the shot image is classified by the filing control section 66 on the basis of the result of face recognition acquired in this manner, the image data can be stored, for example, into a folder prepared in an image file storage 58 for each individual for which a featuring value has been registered in a database for face recognition.

By thus using the subject information acquired at the time of shooting, it is possible to realize various filing processes such as classifying and filing image data for each object, within a practical process time.

In the case where the result of the face recognizing process acquired by the analyzing process for through image data at the time of shooting is included in the subject information, as shown in FIG. 3B, the result of the recognition included in the subject information may be directly used as the result of the recognition by the face recognizing process section 67. Alternatively, if the analyzing process is newly carried out for the corresponding area of the shot image stored in the memory 53, the accuracy of face recognition can be improved.

As described above, in the digital camera according to the invention, subject information related to an object acquired at the time of shooting can be provided for the use in processes related to shot image data after shooting is completed.

For example, if the slide-show facility is linked, various playback facilities can be realized, such as enlarging and displaying plural objects one after another captured in one shot image. Also, if the image filing process is linked, for example, a target area can be limited in the face recognizing process carried out for determination of an object, and the time required for the face recognizing process can be significantly reduced.

Thus, in various facilities, for example, in enlarged display in the slide-show facility and image filing for each object, the process of narrowing an area to be enlarged or an area where the object to be recognized exists, is not necessary, and these facilities can be realized very fast.

Considering that the quality of images shot by using digital cameras has improved year by year and that their applications are greatly expanding, the features of the present invention that enable linking the facility at the time of shooting with the display facilities and the filing facilities after shooting are extremely advantageous not only in digital cameras but also in various video information fields.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A digital camera comprising:
   a characterizing portion detecting unit which analyzes an analysis target image including one of a through image data sequentially taken in from an image pickup device to compose one of a shot of an object, a shot image acquired by shooting, and a reduced image acquired by reducing the shot image, on the basis of a feature appearing in an image representing an object of shooting including a person and an animal, and detects one or more characterizing portions of an object captured in the analysis target image;
   an object information extracting unit which extracts, for respective characterizing portions of the object detected by the characterizing portion detecting unit from the analysis target image corresponding to a shot image acquired by shooting, object information including position data which represents a position of the characterizing portion of the object on a screen corresponding to the analysis target image and corresponding to an expansion of the characterizing portion of the object;
   a tag data writing unit which writes the object information extracted correspondingly to the object, as a part of tag data corresponding to the shot image, to a storage medium which stores image data representing the shot image;
   a positioning unit which specifies a position of the characterizing portion in the shot image based on the position data included in the object information written in the tag data; and
   a display controlling unit which sequentially enlarges and displays each of the characterizing portions in the shot image specified by the positioning unit on a display section when object information related to the one or more characterizing portions is included in the tag data.

2. The digital camera according to claim 1, wherein
   the tag data writing unit writes the object information to be read out sequentially when writing one or more pieces of the object information as a part of the tag data, and
   the positioning unit specifies the position of the characterizing portion in an order of reading out the object information from the tag data.

3. A digital camera comprising:
   an object detecting unit which analyzes an analysis target image including one of a shot image acquired by shooting and a reduced image acquired by reducing the shot image, on the basis of a feature appearing in an image representing an object of shooting including a person, an animal, and a plant, and detects at least one main object captured in the analysis target image;
   an object information extracting unit which extracts, for respective images of at least one object detected by the object detecting unit from the analysis target image corresponding to a shot image acquired by shooting, object information including position data which represents a position of the image of the object on a screen corresponding to the analysis target image and corresponding to an expansion of the image of the object;
   a tag data writing unit which writes the object information extracted correspondingly to the object, as a part of tag data corresponding to the shot image, to a storage medium which stores image data representing the shot image, wherein
   the tag data writing unit has:
   an evaluating unit which evaluates a size of at least one object detected by the object detecting unit; and
   a writing controlling unit which writes in an order determined based on the size obtained by the evaluating unit when writing one or more pieces of the object information to the tag data.

* * * * *